United States Patent [19]

Enomoto et al.

[11] Patent Number: 4,529,575
[45] Date of Patent: Jul. 16, 1985

[54] PROCESS FOR PRODUCING ULTRAFINE SILICON CARBIDE POWDER

[75] Inventors: Ryo Enomoto; Toshikazu Amino, both of Oogaki, Japan

[73] Assignee: Ibiden Kabushiki Kaisha, Oogaki, Japan

[21] Appl. No.: 524,391

[22] Filed: Aug. 18, 1983

[30] Foreign Application Priority Data

Aug. 27, 1982 [JP] Japan ................. 57-147701
Jan. 31, 1983 [JP] Japan ................. 58-12889
Apr. 8, 1983 [JP] Japan ................. 58-61007

[51] Int. Cl.³ ........................................... C01B 31/36
[52] U.S. Cl. ........................ 423/345; 501/88
[58] Field of Search ............... 423/345; 501/88, 90

[56] References Cited

U.S. PATENT DOCUMENTS 2,178,773 11/1939 Benner et al. ................. 423/345
3,271,109 9/1966 Mezey et al. .................. 423/345
4,162,167 7/1979 Enomoto ....................... 423/345

FOREIGN PATENT DOCUMENTS 2848377 1/1980 Fed. Rep. of Germany ...... 423/345
45-10413 1/1970 Japan ................... 423/345
50-160200 12/1975 Japan ................... 423/345
52-13500 2/1977 Japan ................... 423/345
54-67599 5/1979 Japan ................... 423/345
55-80713 6/1980 Japan ................... 423/345

Primary Examiner—William R. Dixon, Jr.
Assistant Examiner—Steven Capella
Attorney, Agent, or Firm—Balogh, Osann, Kramer, Dvorak, Genova & Traub

[57] ABSTRACT

A process for producing an ultrafine silicon carbide powder by passing a granulated blend of silica powder, carbon powder and a carbonaceous binder downwardly through a vertical indirect heating reactor, wherein means are provided for increasing the bulk density of the carbon powder for preventing the disintegration of the blend during the reaction which might result from the use of ultrafine powder as the carbon powder in the blend.

17 Claims, 3 Drawing Figures

PROCESS FOR PRODUCING ULTRAFINE SILICON CARBIDE POWDER

DESCRIPTION OF THE PRIOR ART

The present inventors have previously proposed an invention disclosed in U.S. Pat. No. 4,162,167 (process and an apparatus for producing silicon carbide consisting mainly of beta-type crystal) and established a continuous industrial process for producing silicon carbide consisting substantially of beta-type crystal.

It has been ascertained recently that silicon carbide consisting of beta-type crystal has very excellent properties for use as a base material for the production of pressureless sinters. In use for such a purpose, silicon carbide of especially small particle sizes is required because the smaller the particle size, the better are the sintering and uniform shrinking characteristics of the material. In Japanese Patent Laid-Open No. 160200/1975 which claims a priority based on its original U.S. patent application No. 471,303 filed on May 20, 1974, a beta-type silicon carbide powder of a submicron particle size and a process for producing the same from silicon halide and hydrocarbon by a plasma jet reaction are disclosed. Also, in Japanese Patent Laid-Open No. 67599/1979 is disclosed a process for producing a high-purity beta-type silicon carbide powder of a particle size less than 1 $\mu$m by thermally decomposing an organosilicon polymer. However, any of the starting materials used in the processes disclosed in these patents is very expensive, and there is yet available no industrial process capable of producing an ultrafine beta-type crystal silicon carbide powder which will satisfy the above requirements at low cost.

As a method for producing a fine silicon carbide powder by using silica and carbon as starting materials, Japanese Patent Publication No. 10413/1970 claiming a priority based on its patent U.S. patent application No. 272,236 filed on Apr. 11, 1963, discloses "a process for producing pigment silicon carbide". This patent mentions the preference for the use of as fine a carbon powder as possible for producing a fine silicon carbide powder.

The present inventors have tried to use an extremely fine carbon powder with the object of producing a fine silicon carbide powder in the previously proposed method. It was found, however, that when an extremely fine carbon powder, especially the one having a specific surface area greater than 1 m$^2$/g is used in the previously proposed method, the particulate material in the reaction zone is excessively lowered in crushing strength and disintegrated. Accordingly, gassing in the reaction zone is obstructed, making it impossible to carry on a stable continuous operation. In this method, a granulated blend of silica and carbon powder is charged into a vertical reactor from its top to perform a continuous silicon carbide forming reaction, and it is essential that the blend has an enough crushing strength to remain safe from disintegration and to retain the original shape during its treatment and reactions. Also, for producing a fine silicon carbide powder, it is desirable that the reaction be conducted at as low a temperature as possible. However, in the previously proposed method in which the SiC forming reaction is conducted continuously in the manner described above, it was quite difficult to use a fine carbon powder for the reasons stated above and there was no other choice but to use a carbon powder of relatively coarse particles which is poor in reactivities. Thus, in consideration of the production efficiency and workability, the operation had to be conducted at a relatively high reaction temperature.

BRIEF DESCRIPTION OF THE DRAWINGS

Advantages of the invention will be apparent from the following detailed description of the invention taken in conjunction with the accompanying drawings in which.

DETAILED DESCRIPTION OF THE PROCESS

Figure 1:
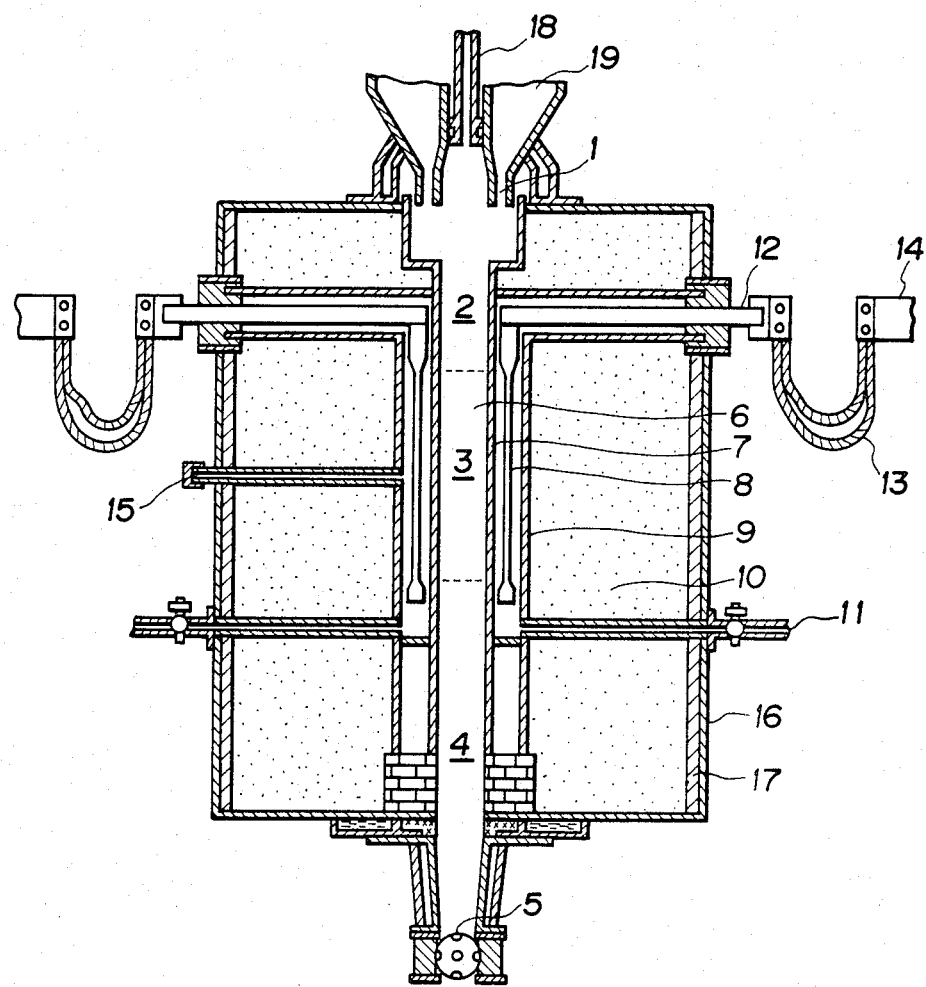
FIG. 1 is a schematic longitudinal sectional view of a vertical continuous producing apparatus used in the Examples of this invention and in the Comparative Examples.

As a result of extensive studies aimed at improving the crushing strength of the particulate material comprising an extremely fine carbon powder in the reaction zone, the present inventors found quite surprisingly and unexpectedly that, by using at least one of the following three types of carbon powder having a specific surface area of 1 to 1,000 m$^2$/g: (a) one mixed with a liquid mainly composed of a liquid organic compound before or at latest when said carbon powder is granulated, (b) one mixed with water containing a surfactant before the carbon powder is granulated, and (c) one which has been improved in water wettability by oxidizing the powder particle surfaces by heating them in an oxidizing atmosphere, said carbon powder being mixed with water before or at latest when it is granulated, the granulated material can be turned into one which has a high crushing strength and can retain the initial shape even in the reaction zone. This finding has led us to the confident belief that an extremely fine silicon carbide powder consisting essentially of beta-type crystal could be produced at low cost and with ease in a continuous process by using said particulate material, and this finding was materialized as the present invention.

Thus, the object of this invention can be attained by practising one of the following three processes:

a process of producing silicon carbide which includes charging a particulate material prepared by blending and granulating silica powder, carbon powder and a carbonaceous binder into a reactor from its top, said reactor having a preheating zone, a heating zone and a cooling zone, allowing the charged material to descend under its own weight in the preheating zone of the reactor till reaching the heating zone, heating the material horizontally in said heating zone to effect a SiC forming reaction, allowing the reaction product to further descend in the cooling zone for cooling it under a non-oxidizing atmosphere, and discharging the reaction product from a lower part of the cooling zone of the reactor, wherein the carbon powder contained in the particulate material is one having a specific surface area within the range from 1 to 1,000 m$^2$/g and mixed with a liquid mainly composed of a liquid organic compound before or at latest when the carbon powder is granulated, and the reaction temperature in the heating zone is controlled within the range from 1,500° to 2,000° C.;

a process of producinfg silicon carbide which includes charging a granulated material prepared from silica powder, carbon powder and a carbonaceous binder into a reactor from its top, the reactor having a preheating zone, a heating zone and a cooling zone, allowing the charged material to descend under its own weight in the preheating zone of the reactor till reaching the heating zone, heating the material horizontally in the heating zone to effect a SiC forming reaction, allowing the reaction product to further descend in the cooling zone for cooling it under a non-oxidizing atmosphere, and then discharging the reaction product from a lower part of the cooling zone of the reactor, wherein the carbon powder contained in the granulated material is one having a specific surface area within the range from 1 to 1,000 m²/g and mixed with water containing a surfactant before the carbon powder is granulated, and the reaction temperature in the heating zone is controlled within the range from 1,500° to 2,000° C.; and a process for producing silicon carbide which includes charging a granulated material prepared from silica powder, carbon powder and a carbonaceous binder into a reactor from its top, the reactor having a preheating zone, a heating zone and a cooling zone, allowing the charged material to descend under its own weight in the preheating zone of the reactor till reaching the heating zone, heating the material horizontally in the heating zone to effect a SiC forming reaction, allowing the reaction product to further descend in the cooling zone for cooling it under a non-oxidizing atmosphere, and discharging the reaction product from a lower part of the cooling zone of the reactor, wherein the carbon powder contained in the granulated material is one having a specific surface area within the range from 1 to 1,000 m²/g and improved in its water wettability by oxidizing the powder particle surfaces by heating them in an oxidizing atmosphere and also mixed with water before or at latest when the carbon powder is granulated, and the reaction temperature in the heating zone is controlled within the range from 1,500° to 2,000° C.

The present invention will now be described in more detail.

The silicon carbide forming reaction using silica and carbon as starting materials can be generally expressed by the following formula (1):

$$SiO_2 + 3\,C \rightarrow SiC + 2CO \tag{1}$$

However, it is known that the actual SiC forming mechanism consists essentially in the formation of SiO gas by the reaction of the following formula (2) and further reaction of said SiO gas with carbon according to the formula (3) to produce silicon carbide:

$$SiO_2 + C \rightarrow SiO + CO \tag{2}$$

$$SiO + 2C \rightarrow SiC + CO \tag{3}$$

In the process of this invention, it is desirable that the SiO gas produced by the reaction of formula (2) be quickly subjected to the SiC forming reaction of the formula (3), with the SiO gas partial pressure in the reactor being inhibited from rising to any significant degree. This is for the following reason. If the SiO gas partial pressure in the reactor rises in the process of this invention, the reaction rate of the formula (3) increases correspondingly but, in this case, since the reaction of the formula (3) is principally devoted to the growth and coarsening of the SiC crystals, it is difficult to obtain fine SiC particles under a condition of a high SiO gas partial pressure and, in an extreme case, part of the SiO gas ascends to the preheating zone to induce the reactions as expressed by the following formulae (4), (5) and (6), causing SiO₂, Si, SiC and C to precipitate in a mixed state in the preheating zone. These precipitates have a cohesive force and coagulate with each other to hinder the smooth descent of the material which is essential for the continuous production of silicon carbide, thus making it impossible to perform a prolonged continuous stable operation.

$$2SiO \rightarrow SiO_2 + Si \tag{4}$$

$$SiO + CO \rightarrow SiO_2 + C \tag{5}$$

$$3SiO + CO \rightarrow 2SiO_2 + SiC \tag{6}$$

In the process of this invention, in order to inhibit the rise of the SiO gas partial pressure and to obtain an ultrafine silicon carbide powder, it is imperative to use a carbon powder having a specific surface area within the range from 1 to 1,000 m²/g. This is because if the specific surface area of the carbon powder is less than 1 m²/g, there are provided few sites where the reaction of the formula (3) is allowed to take place and the SiC forming reaction by the growth of crystals becomes predominant, making it difficult to produce an ultrafine silicon carbide powder aimed at in this invention. On the other hand, a carbon powder having a specific surface area greater than 1,000 m²/g appears to be desirable when the reaction performance of the process is considered, but actually such a carbon powder is very difficult to obtain and, also because of its extremely low bulk specific gravity, the particulate material is increased in void fraction and excessively lowered in crushing strength. Generally, a carbon powder having a specific surface area within the range from 10 to 500 m²/g is relatively easy to obtain and also can give a good result.

It is desirable that the carbon powder used in this invention is at least one type of carbon black selected from contact black, furnace black, thermal black and lamp black and, among them, thermal black is most suited because it can provide a particulate material with a low chain structure of the particle and a high crushing strength.

The silica used in this invention is preferably one having an average particle size within the range from 20 to 170 μm for the following reason. If the average particle size of the silica is less than 20 μm, the reaction of the formula (2) is very fast and it is difficult to keep the SiO gas partial pressure at a sufficiently low level. On the other hand, if it is greater than 170 μm, the crushing strength of the particulate material after the reaction is excessively lowered because the sites where there have been silica particles are left as voids. A good result can be obtained especially when the average particle size of the silica used in this invention is within the range from 30 to 160 μm.

Both silica and carbon powder used in this invention are smaller in particle size and better in reactivity than the conventional materials, so that it is expedient to granulate both silica and carbon powder to enhance gas permeability of the material while facilitating release of CO gas produced during the reaction to thereby expedite the reaction, and to even out the SiO gas partial pressure in the reactor. It is also advantageous that the particulate material has a void fraction within the range from 35 to 55% and a bulk density within the range from 0.40 to 0.90 g/cm$^3$.

The reason for the preference for the void fraction of 35 to 55% is that if it is lower than 35%, the gas permeability of the material proves so low that no effective release of gas produced during the reaction can be made, causing a local elevation of the SiO gas partial pressure in the particulate material to invite coarsening of the crystal grains. As far as the release of the reaction product gas is concerned, a higher void fraction is more desirable, but if it exceeds 55%, the strength of the particulate material is extremely reduced, causing disintegration of the material in the reactor to greatly deteriorate the gas permeability of the material.

The advantage in selecting the bulk density of the particulate material within the range from 0.40 to 0.90 g/cm$^3$ owes to the following reason. Generally, the lower the bulk density, the more desirable for gas permeability and other matters, but in order to form a particulate material having a bulk density lower than 0.40 g/cm$^3$, it is necessary either to remarkably elevate the void fraction of the material or to define the particle size of the material within a narrow range, but too much elevation of the void fraction results in an excessively reduced strength of the material while the definition of the particle size of the material within a narrow range leads to an increase in material cost. On the other hand, if the bulk density is higher than 0.90 g/cm$^3$, the material proves to be poor in reaction gas permeability and a high-temperature gas flow in the preheating zone becomes non-uniform. This not only discourages heat exchange between the material and the high-temperature gas but also makes the material highly susceptible to the effect of precipitates from said SiO gas. As a result, the smooth gravitational descent of the material is retarded and it becomes difficult to maintain a stablized operation for a long time. The best result can be obtained when the bulk density of the particulate material is within the range from 0.50 to 0.80 g/cm$^3$.

It is advantageous to define the average particle size of the particulate material within the range from 5 to 20 mm. This is because if the average particle size of the material is less than 5 mm, no intended effect of granulation is provided, while if it is greater than 20 mm, the reaction of the material slows down to result in a poor economy.

In this invention, it is essential that the particulate material retain its initial shape even when exposed to a high temperature in the reaction zone. Also, the carbon powder used in this invention needs be at least one of the following types: (a) one mixed with a liquid composed mainly of a liquid orgainic compound before or at latest when said carbon powder is granulated, (b) one mixed with water containing a surfactant before said carbon powder is granulated, and (c) one which has been heated in an oxidizing atmosphere to oxidize the powder particle surfaces to improve water wettability, the carbon powder being mixed with water before or at latest when the carbon powder is granulated. This is for the following reason. A carbon powder having an extremely large specific surface area such as one used in this invention is usually composed of fine particles present formed into masses or aggregates, that is, in the form of "secondary" particles. Adhesion between the individual particles in such masses or secondary particles is not so strong, so that if such a carbon powder is merely mixed and granulated with silica and a carbonaceous binder, it is hardly possible to make a granulated material having an enough crushing strength to retain the initial shape without disintegration in the reaction zone. However, a carbon powder of any of the above-mentioned three types (a) to (c) has a surprising effect of enabling easy production of a granulated material having a crushing strength high enough to prevent disintegration even in the reaction zone.

The mechanism that accounts for such a high crushing strength (enough to prevent disintegration even in the reaction zone) by the use of the above carbon powder is not yet elucidated, but is supposed that in the drying step after wetting of the carbon powder with a liquid organic compound or water, the carbon powder particles are drawn to each other due to the surface tension of the liquid organic compound or water and relatively increased in bulk density to give a certain action or effect for the improvement in the crushing strength of the material in the reaction zone.

In this invention, it is advantageous to use liquid organic compound which has a good wettability for the carbon powder, and the following substances may be used as the liquid organic compound: benzene, acetone, toluene, hexane, isohexane, heptane, isoheptane, isooctane, cyclohexane, ethylbenzene, chloroform, carbon tetrachloride, dichloroethane, dichloroethylene, trichloroethylene, nonane, xylene, methyl alcohol, ethyl alcohol, butyl alcohol, isobutyl alcohol, propyl alcohol, isopropyl alcohol, ethyl ether, isopropyl ether, ethyl formate, methyl acetate, ethyl acetate, isprolyl acetate, ethyl propionate, amyl propionate, butyl lactate, diethyl carbonate, fluoroacetic acid, dietylene dimethyl ether, ethyl methyl ketone, quinoline and those which have similar functions.

In this invention, the surfactant is preferably at least one of the substances selected from amine, organic compounds having a carboxyl group, organic compounds having a sulfo group, esters, ammonium compounds, organic compounds having an ether linkage, and alcohols. Exemplary of such substances are fatty acid salts, alkylbenzenesulfonates, straight-chain alkylbenzenesulfonates, α-olefinsulfonates, sulfonates of naphthalene/formalin condensate, polyoxyethylene alkylphenyl ether, saccharides, and various kinds of alcohols, and these substances may be used either alone or in admixture.

In this invention, the surfactant is preferably added in an amount of at least 0.05 part by weight to 100 parts by weight of the carbon powder. If the amount of said surfactant added is less than 0.05 part by weight, no desired improvement in water wettability of the carbon powder is provided, resulting in an unsatisfactory crushing strength of the granulated material and possible disintegration thereof in the reaction zone. Too much addition of the surfactant is uneconomical. It is advantageous to add the surfactant in an amount not greater than 5 parts by weight, most preferably within the range from 0.1 to 3 parts by weight.

According to this invention, the carbon powder and water containing a surfactant are uniformly mixed and such uniform mixing can be advantageously attained by any of the following methods: a method whereby, in mixing silica, the carbon powder and a carbonaceous binder to form a blend, the surfactant is added in the form of an aqueous solution; a method whereby silica, the carbon powder, a carbonaceous binder, water and the surfactant are mixed simultaneously to form a blend; or a method whereby the surfactant and water are added to the carbon powder before blending silica and a carbonaceous binder.

According to this invention, the water wettability of the carbon powder can be improved by heating the powder in an oxidizing atmosphere to oxidize the powder particle surfaces.

In this invention, heating of the carbon powder for oxidizing the powder particle surfaces is preferably conducted at a temperature not lower than 200° C., and the heating time is advantageously not less than 0.5 hour. This is because if the heating temperature is below 200° C., it is found difficult to properly oxidize the particle surfaces of the carbon powder, while if the heating time is shorter than 0.5 hour, desired oxidization of the particle surfaces may not be attained and, in either case, it is hardly possible to improve the water wettability of the carbon powder. Too high a heating temperature causes too much oxidization and loss of the carbon powder, so that it is advantageous to conduct the heating at a temperature not higher than 600° C. or to control the amount of oxygen in the atmosphere.

In this invention, it is advantageous to have the oxidizing atmosphere loaded with steam. This is because the steam-loaded atmosphere helps to promote the oxidization of the carbon powder particle surfaces, allowing an effective improvement in the water wettability of the carbon powder even at a relatively low temperature.

According to this invention, the oxygen content of the carbon powder is preferably at least 0.2% by weight. If the oxygen content of the carbon powder is less than 0.2% by weight, there is not provided the desired water wettability of the carbon powder and it is hard to obtain a particulate material having enough crushing strength to prevent disintegration in the reaction zone. The carbon powder with too high an oxygen content is not only very difficult to produce but may also lead to a poor yield of the reaction product, resulting in a poor economy. Thus, the oxygen content of the carbon powder should preferably be less than 5% weight.

In this invention, it is desirable that the amount of the carbonaceous binder is within the range from 3 to 25 parts by weight, in terms of the amount of fixed carbon, to 100 parts by weight of silica and carbon powder combined. This is for the reason that if the amount of the binder blended is less than 3 parts by weight, the crushing strength of the material is low in the reaction zone so that the product in the reactor tends to disintegrate, while the binder amount in excess of 25 parts by weight not only necessitates an increased expenditure for the binder but also increases the amount of carbon produced by the thermal decomposition of the binder, encouraging formation of coarse silicon carbide particles. The best result is obtained when the amount of the binder is within the range from 5 to 20 parts by weight.

In this invention, it is desirable that the carbonaceous binder is at least one selected from petroleum pitch, coal tar pitch, wood tar pitch, asphalt, phenolic resin, petroleum tar, coal tar, wood tar, saccharides, ligninsulfonates and alginates. Especially, use of a carbonaceous binder which is scarcely or sparingly soluble in water, such as petroleum pitch, coal tar pitch, wood tar pitch, asphalt, phenolic resin, petroleum tar, coal tar or wood tar, is preferred because they can be mixed without much dispersion into the secondary particles when the above-mentioned carbon powder (b) or (c) is used, resulting in a high yield of the product and a good result by the use of a limited amount of the binder.

In preparing a particulate material by using the carbon powder (a) according to this invention, it is advantageous to blend a liquid organic compound in an amount of at least 10 parts by weight to 100 parts by weight of said material before or during granulation of the material. If the amount of the liquid organic compound blended is less than 10 parts by weight, the distribution of the liquid organic compound in the blend becomes non-uniform, making it impossible to maintain the required crushing strength of the material in the reaction zone. As far as the uniformity of distribution, is concerned, the greater the amount of the liquid organic compound the better, but too much addition of the liquid organic compound is not only uneconomical but also makes it difficult to uniformly granulate the material, with the result that the obtained material would be deformed during treatment or the particles therein tend to adhere and agglomerate. Accordingly, the amount of the liquid organic compound is advantageously less than 100 parts by weight.

In case of using the carbon powder (b) or (c), it is preferred to add water in an amount of 7 to 25 parts by weight to 100 parts by weight of the material either before or during granulation of the material. If the amount of water is less than 7 parts by weight, the distribution of water in the blend becomes non-uniform, resulting in a reduced crushing strength of the material in the reaction zone. On the other hand, if water is added in a greater amount than 25 parts by weight, not only it becomes difficult to uniformly granulate the material but also the obtained material tends to be deformed during the treatment thereof or individual particles therein tend to agglomerate. A good result is obtained especially when the amount of water is within the range from 10 to 20 parts by weight.

In this invention, it is advantageous for the production of a fine silicon carbide powder to increase areas where the reaction of the above-shown formula (3) occurs by increasing the amount of carbon in the material to thereby arrest the rise of the SiO gas partial pressure and, for this purpose, it is advantageous to control the carbon to silica molar ratio ($C/SiO_2$) in the blended material within the range from 3.2 to 5.0.

According to this invention, the blend of silica, carbon powder and carbonaceous binder is sufficiently mixed to form a homogeneous mixture, which is then granulated by a granulator such as pan granulator, drum granulator, horizontal vibration granulator, briquette machine, fluid mixing granulator or such.

According to this invention, the granulated material is charged in a reactor from the top thereof, said reactor having a preheating zone, a heating zone and a cooling zone, and the charged material is allowed to descend under its own weight in the preheating zone either continuously or intermittently until reaching the heating zone. In the heating zone, the material is heated in the horizontal direction thereof to effect a SiC forming reaction. The reaction product is further allowed to descend in the cooling zone for cooling under a non-oxidizing atmosphere, and finally discharged out continuously or intermittently from the bottom of the cooling zone of the reactor. The desired silicon carbide is produced in this way.

In order to produce an extremely fine silicon carbide powder according to this invention, it is essential to control the reaction temperature in the heating zone within the range from 1,500° to 2,000° C. This is because if the reaction temperature is below 1,500° C., the reaction shown by the formula (2) advances too slow to effectively produce the desired silicon carbide powder, while if it is higher than 2,000° C., the produced silicon carbide crystals tend to grow further, making it impossible to produce extremely fine beta-type silicon carbide intended in this invention.

According to this invention, the reaction temperature is lower than that required in the continuous silicon carbide producing method previously invented and proposed by the present inventors, and accordingly, the amount of energy required for the operation is reduced and further the durability of the production facilities is markedly enhanced.

An example of the apparatus directly used for carrying out the process of this invention will now be described by referring to the accompanying drawings.

As shown in FIG. 1, the apparatus used directly for performing the process of this invention comprises a reactor 6 having a material feed port 1, a preheating zone 2, a heating zone 3, a cooling zone 4 and a product discharge port 5 which can be closed airtightly, each arranged vertically in succession. A cylinder 7 forming said heating zone is made of graphite and provided with means 8 and 9 for electrically heating the charged material in the heating zone indirectly. Also, a heat-insulating layer 10 made of carbon or graphite is provided at least around the heating zone. The reactor 6 is set in the center of the apparatus, and a non-oxidizing gas such as Ar, He, $N_2$, CO, or $H_2$ is supplied from a non-oxidizing gas inlet 11 into the space defined by the graphite-made heater element 8 and a graphite-made reflector cylinder provided in close proximity to the heater element, whereby the waste of said graphite-made heater element by air oxidation is prevented.

The present invention will now be further described by way of the embodiments thereof. EXAMPLE 1

100 parts by weight of silica powder ($SiO_2$ content 99.7% by weight) having an average particle size of 153 μm, 63 parts by weight of thermal black powder (F.C. content 98.5% by weight) having a specific surface area of 25 $m^2/g$, 35 parts by weight of a high-pitch powder (F.C. content 50.4% by weight) having an average particle size of 40 μm and 140 parts by weight of benzene were blended and mixed by a fret mill for 3 hours and then dried to obtain a solid mixture. This mixture was disintegrated and charged into a pan granulator for granulating the mixture while spraying a 0.5% aqueous solution of CMC. After regulating the particle size by passing through a screen and a bar grizzly, the granulated mixture was placed in a band type through-gas drier and dried by hot air of 150° C. for 90 minutes. The obtained particulate material had an average particle size of 10.3 mm, a void fraction of 51%, a bulk density of 0.64 $g/cm^3$, and a $C/SiO_2$ molar ratio of 4.0.

This particulate material was charged into a vertical indirect heating reactor as shown in FIG. 1 from the top thereof, allowed to descend continuously under its own weight in the heating reactor till reaching the heating zone controlled at a reaction temperature of 1,650° C. The charged material in the heating zone, while allowing it to descend under its own weight at a speed of 0.60 m/hr, was indirectly heated in the horizontal direction to effect a SiC forming reaction. The reaction product was further allowed to descend under its own weight through the cooling zone and discharged continuously from the discharge port.

The specifications of the indirect heating reactor used in this operation were as shown in Table 1. The span of filling with the charged material in the heating zone was 0.24 m.

TABLE 1

| Designation | Specifications |
| --- | --- |
| Indirect electrical heating means | Graphite heater element |
| | Graphite reflector cylinder |
| Product recovery device | Water-cooled rotary valve |
| Effective heat transfer range | 0.24 m |
| Reactor wall thickness | 0.045 m |
| Height of preheating zone | 1.2 m |
| Height of heating zone | 1.3 m |
| Height of cooling zone | 1.5 m |
| Heat insulating material | Carbon black powder |
| Heat-insulating layer thickness | 0.50 m |

Figure 2:
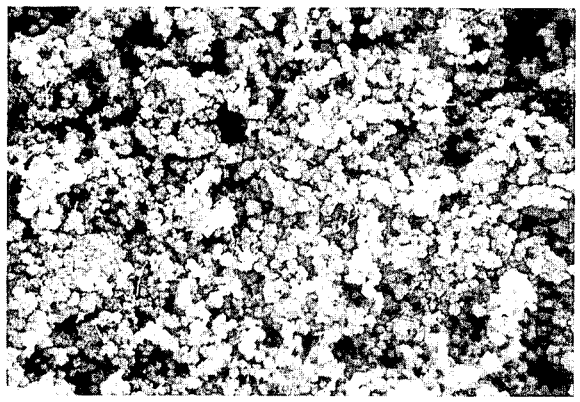
FIG. 2 is a scanning electron photomicrograph (magnification: 2,700X) of the silicon carbide powder obtained in Example 1.

The obtained reaction product, after removing free carbon therefrom, was subjected to a 5-hour wet disintegration with a ball mill of 250 mm φ in inner diameter at a speed of 48 r.p.m. and then immersed in a 10% aqueous solution of HF for 3 hours to remove free silica and purify the product. The content of silicon carbide consisting of beta-type crystals in the product silicon carbide obtained after the purification treatment was 96.6%, as measured by X-ray diffraction, and the particle shape was round or close to round as seen in a scanning electron photomicrograph (magnification: 2,700X) of FIG. 2. The product was a fine powder relatively uniform in particle and having a specific surface area of 36.2 $m^2/g$.

COMPARATIVE EXAMPLE 1

100 parts by weight of silica powder ($SiO_2$ content 99.7% by weight) having an average particle size of 153 μm, 76 parts by weight of petroleum coke powder (F.C. content 98.7% by weight) having an average particle size of 29 μm and 7 parts by weight of a high-pitch powder (F.C. content 50.4% by weight) having an average particle size of 43 μm were blended and mixed by a vertical screw mixer for 10 minutes. The blend was granulated by a pan granulator while spraying a 0.5% aqueous solution of CMC, then passed through a screen and a bar grizzly for regulating the particle size and dried hot air of 150° C. in a band-type through-gas drier for 90 minutes to obtain a particulate material having an average particle size of 10.5 mm, a void fraction of 47%, a bulk density of 0.62 $g/cm^3$ and a $C/SiO_2$ molar ratio of 4.0.

This particulate material was treated in the substantially same way as in Example 1 except that the reaction temperature was controlled at 1,900° C. and that the charged material in the heating zone was allowed to descend under its own weight at a rate of 0.60 m/hr to effect a SiC forming reaction.

Figure 3:
FIG. 3 is also a scanning electron photomicrograph (magnification: 2,700X) of the silicon carbide powder obtained in Comparative Example 1.

The properties of the reaction product were measured in the same manner as in Example 1 and are shown in Table 2. The particle shape is shown by a scanning electron photomicrograph (magnification: 2,700X) of FIG. 3.

COMPARATIVE EXAMPLE 2

The process of Comparative Example 1 was followed except that the reaction temperature was controlled at 1,650° C., lower than that in Comparative Example 1, and that the charged material descending speed was lowered to 0.40 m/hr to thereby obtain the reaction product.

The properties of the obtained reaction product were measured in the same way as in Example 1 and are shown in Table 2. A relatively fine silicon carbide powder having a specific surface area of 22.7 $m^2/g$ could be obtained, but unreacted silica remained in a high ratio in the product powder (the free silica content in the product being 21.7% by weight). Also, precipitates were formed in large volume from the SiO gas in the preheating zone to make it impossible to allow the charged material to descend smoothly under its own weight.

EXAMPLE 2 AND COMPARATIVE EXAMPLE 3

Specimens of particulate material were prepared according to Example 1 but by changing the amounts of the high-pitch powder and benzene as shown in Table 2, and each specimen was treated in the same way as in Example 1 to obtain a reaction product.

The properties of the obtained reaction products were determined by the method of Example 1 and are shown in Table 2.

In Example 2, a prolonged stable continuous operation was possible, but in Comparative Example 3, the charged material disintegrated in the reactor and the continuous operation was impossible.

EXAMPLE 3

A particulate material having the properties as shown in Table 2 was obtained in the same way as in Example 1.

This particulate material was charged into the same indirect heating reactor as that used in Example 1 and treated under the conditions shown in Table 2 to obtain a reaction product.

The properties of the obtained reaction product were determined by the same method as in Example 1 and the results were shown in Table 2.

EXAMPLE 4

A particulate material was prepared in the same way as in Example 1 except for use of silica ($SiO_2$ content 99.6% by weight) having an average particle size of 25 $\mu m$ as shown in Table 2, and this particulate material was treated under the same conditions as in Example 1 to obtain a reaction product.

The properties of the obtained reaction product were determined by the method of Example 1 and are shown in Table 2.

EXAMPLE 5

The process of Example 1 was repeated but by controlling the reaction temperature higher than that in Example 1 and elevating the charged material descending speed to obtain a reaction product.

The properties of the obtained reaction product were determined by the method employed in Example 1 and the results are shown in Table 2. The produced silicon carbide powder was slightly reduced in specific surface area to 29.8 $m^2/g$, but the gravitational descent of the charged material was smooth and the operation could be continued stably for a long time. It was also possible to improve the production capacity per unit system.

TABLE 2

| | | $SiO_2$ average particle size ($\mu m$) | Inorganic carbon Kind | Specific surface area ($m^2/g$) | Binder Kind | Amount (parts by weight) | liquid Organic Compound Kind | Amount (parts by weight) |
|---|---|---|---|---|---|---|---|---|
| Example | 1 | 153 | thermal black | 25 | high-pitch powder | 35 | benzene | 140 |
| Comparative Example | 1 | " | petroleum coke | (29 $\mu m$) | high pitch powder | 7 | — | — |
| Comparative Example | 2 | " | petroleum coke | (29 $\mu m$) | high pitch powder | " | — | — |
| Example | 2 | " | thermal black | 25 | high pitch powder | 12 | benzene | 50 |
| Comparative Example | 3 | " | thermal black | " | high pitch powder | 7 | " | " |
| Example | 3-1 | " | thermal black | " | high pitch powder | 35 | benzene | 200 |
| | 3-2 | " | thermal black | " | high pitch powder | " | " | " |
| | 3-3 | " | thermal black | " | high pitch powder | " | " | 100 |
| | 3-4 | " | thermal black | " | high pitch powder | " | " | " |
| | 3-5 | " | thermal black | " | high pitch powder | " | " | 140 |
| | 3-6 | " | channel black | 128 | high pitch powder | " | " | " |
| Example | 4 | 25 | thermal black | 25 | high pitch powder | " | " | " |
| Example | 5 | 153 | thermal black | " | high pitch powder | " | " | " |

| Particulate material | Void | Bulk | Charged material descending | Reaction | $\beta$-SiC | Silicon carbide specific surface | Free silica content in |

TABLE 2-continued

| C/SiO₂ molar ratio | fraction (%) | density (g/cm³) | speed (m/hr) | temperature (°C.) | content (%) | area (m²/g) | product (% by weight) |
|---|---|---|---|---|---|---|---|
| 4.0 | 51 | 0.64 | 0.60 | 1650 | 96.6 | 36.2 | 4.0 |
| " | 47 | 0.62 | " | 1900 | 90.2 | 14.3 | 2.0 |
| " | " | " | 0.40 | 1650 | 80.5 | 22.7 | 21.7 |
| 3.4 | 54 | 0.58 | 0.60 | " | 95.4 | 37.1 | 3.5 |
| 3.3 | 56 | 0.56 | " | " | — | — | — |
| 4.0 | 50 | 0.68 | " | " | 96.9 | 35.4 | 3.8 |
| " | " | 0.55 | " | " | 97.5 | 33.2 | 3.6 |
| " | 55 | 0.55 | " | " | 96.3 | 34.8 | 3.2 |
| " | 46 | 0.63 | " | " | 95.1 | 35.7 | 3.5 |
| " | 51 | 0.64 | 0.80 | " | 95.2 | 37.9 | 4.8 |
| " | 48 | 0.57 | 1.30 | " | 89.7 | 38.7 | 4.2 |
| " | 52 | 0.56 | 0.60 | " | 97.8 | 37.5 | 0.6 |
| " | 51 | 0.64 | 0.80 | 1900 | 98.5 | 29.8 | 0.8 |

EXAMPLE 6

1.5 parts by weight of polyoxyethylene alkylphenyl ether and 100 parts by weight of water were added to 100 parts by weight of thermal black powder (F.C. content 98.5% by weight) having a specific surface area of 25 m²/g, and they were mixed well by using a fret mill. The mixture was dried at 120° C. until it was brought into the state of a wet powder. Then 163 parts by weight of silica powder (SiO₂ content 99.8% by weight) having an average particle size of 50 μm and 53 parts by weight of a high-pitch powder (F.C. content 50.4% by weight) were added to the above thermal black powder and further mixed well. The mixture was granulated by a pan granulator while spraying a 0.5% aqueous solution of CMC and then dried by hot air of 150° C. in a band-type through-gas drier for 90 minutes. The water content of the particulate material before drying was about 12% by weight, and the dried particulate material had an average particle size of 11.0 mm, a void fraction of 45%, a bulk density of 0.76 g/cm³, and a C/SiO₂ molar ratio of 4.0.

This particulate material was treated in the same way as in Example 1 but by controlling the reaction temperature at 1,700° C. to effect a SiC forming reaction.

The obtained reaction product was purified and its properties were determined in the same way as in Example 1. The content of silicon carbide consisting of beta-type crystal was 96.4% and its specific surface area was 34.8 m²/g. The particle shape, as observed under a scanning electron miscroscope, was round or close to round and also the product powder was relatively uniform in particle size.

EXAMPLE 7 AND COMPARATIVE EXAMPLE 4

Specimens of the particulate material were prepared in the same way as in Example 6 except that the amounts of the surfactant and water added were changed as shown in Table 3.

Each specimen was properly collected, charged into a Tamman crucible in an argon gas atmosphere and maintained therein at 1,700° C. for one hour to obtain a reaction product.

The properties of the obtained reaction products were determined according to the method of Example 1 and are shown in Table 3.

TABLE 3

| | Amount of surfactant blended (parts by weight) | Water content of particulate material before drying (% by weight) | Void fraction of particulate material (%) | Product properties | | |
|---|---|---|---|---|---|---|
| | | | | β-SiC content (%) | SiO₂ content (% by weight) | Crushing strength (kg) |
| Example 6 | 1.5 | 12 | 45 | 96.4 | 1.6 | 1.5 |
| Example 7-1 | 0.05 | " | 48 | 96.2 | 1.5 | 1.1 |
| Example 7-2 | 3 | " | 42 | 96.5 | 1.8 | 1.7 |
| Example 7-3 | 1.5 | 7 | 50 | 96.0 | 1.3 | 1.1 |
| Example 7-4 | " | 22 | 38 | 97.0 | 2.0 | 2.2 |
| Example 7-5 | " | 12 | 38 | 97.1 | 2.1 | 2.0 |
| Example 7-6 | " | " | 50 | 96.0 | 1.1 | 1.3 |
| Example 9 | " | " | 48 | 96.1 | 0.9 | 1.1 |
| Example 10 | " | " | 45 | 98.9 | 0.5 | 1.4 |
| Example 11 | 2.5 (fine granulated sugar) | " | 45 | 96.5 | 1.6 | 1.7 |
| Example 12 | 2 (ethylene glycol) | " | 47 | 96.5 | 1.6 | 1.5 |
| Comparative Example 4-1 | 0.02 | " | 46 | 95.7 | 0.9 | 0.5 |
| Comparative Example 4-2 | 1.5 | 5 | — | — | — | — |
| Comparative Example 4-3 | " | 27 | — | — | — | — |
| Comparative Example 4-4 | " | 12 | 32 | 96.0 | 2.5 | 2.7 |

Note: The crushing strength was measured with the particulate product under static load.

Each of the reaction products in Example 7 had an enough crushing strength to retain its original shape. On the other hand, the reaction product of Comparative Example 4-1 was so low in crushing strength that it could not stand a continuous operation. Also in Comparative Example 4-2 where the water content in the material was excessively reduced and in Comparative Example 4-3 where the water content was excessively increased, the reaction product could not be granulated. In Comparative Example 4-4 where the rolling time in the granulating operation was elongated to reduce the void fraction, a prominently high crushing strength was obtained but the product was poor in reactivities and also the produced silicon carbide particles were coarse. The crushing strength was measured by applying a static load to the product.

EXAMPLE 8

Specimens of the particulate material were prepared in the same way as in Example 6 except that a fatty acid salt, an alkylbenzenesulfonate, a straight-chain alkylbenzenesulfonate, an α-olefinsulfonate, a sulfonate of a naphthalene/formalin condensate, polyoxyethylene alkyl ether and polyoxyethylene nonylphenyl ether were used instead of polyoxyethylene alkylphenyl ether, and these specimens were treated by following the process of Example 7 to obtain reaction products.

Any of these reaction products had an enough crushing strength to retain the original shape, and silicon carbide powders obtained by purifying these reaction products were all extremely fine.

EXAMPLE 9

A particulate material was prepared in the same manner as in Example 6 except for use of channel black powder (specific surface area 128 $m^2/g$, F.C. content 98.1% by weight) as carbon powder, and this material was treated according to Example 6 to obtain a reaction product. The properties of the obtained reaction product were determined by the same method as in Example 1, showing that the content of silicon carbide consisting of beta-type crystal was 96.1% and its specific surface area was 36.4 $m^2/g$. The operation could be conducted very smoothly throughout the process.

EXAMPLE 10

The process of Example 6 was followed but by controlling the reaction temperature at 1,900° C. (higher than that in Example 6) while elevating the charged material descending speed to 0.80 m/hr to obtain a reaction product.

The properties of the obtained reaction product were determined by the method of Example 1 and the results are shown in Table 3. The produced silicon carbide powder was slightly reduced in specific surface area (29.3 $m^2/g$), but the gravitational descent of the charged material was smooth and a prolonged stabilized continuous operation was possible. The production capacity per unit system was also high.

EXAMPLE 11

A particulate material was prepared according to Example 6 except that 2.5 parts by weight of fine granulated sugar was blended instead of polyoxyethylene alkylphenyl ether and a phenolic novolak (F.C. content 51.6% by weight) was used in place of the high-pitch powder as binder, and this material was treated according to Example 6 to obtain a reaction product.

This reaction product had a crushing strength of 1.7 kg, slightly higher than that of the product of Example 6, and the silicon carbide powder obtained by purifying said reaction product was extremely fine and could well conform to the object of this invention. Also, the operation could be conducted stably for a long time.

The $C/SiO_2$ molar ratio in the particulate material was adjusted to 4.0.

EXAMPLE 12

100 parts by weight of the same thermal black powder as that used in Example 6, 163 parts by weight of the same silica powder as that used in Example 6, 53 parts by weight of the same high-pitch powder as that used in Example 6, 2 parts by weight of ethylene glycol and 150 parts by weight of water were sufficiently mixed by a fret mill and granulated after the manner of Example 6 to prepare a particulate material.

This particulate material was treated as in Example 6 to obtain a reaction product.

The properties of the obtained reaction product were determined by the same method as in Example 1 and the results are shown in Table 3.

The operation in this Example 12 was very stable, and a prolonged continuous operation was possible.

EXAMPLE 13

The same thermal black powder as that used in Example 6 was charged into a heating oven maintained at 250° C. and subjected to a 2-hour heating treatment under an air atmosphere. Thereafter, the thermal black powder had a specific surface area of 28 $m^2/g$ and an oxygen content of about 0.37% by weight and showed a good wettability by water.

100 parts by weight of said thermal black powder, 163 parts by weight of the same silica powder as that used in Example 6 and 53 parts by weight of the same high-pitch powder as that used in Example 6 were sufficiently mixed by a Nauta mixer and treated to form a particulate material according to the method of Example 6.

This particulate material was further treated as in Example 6 to obtain a reaction product.

The properties of the obtained reaction product were determined in the same way as in Example 1, disclosing that the content of silicon carbide consisting of beta-type crystal in the product was 96.5% and the specific surface area thereof was 35.2 $m^2/g$.

EXAMPLE 14 AND COMPARATIVE EXAMPLES 5 AND 6

Specimens of the particulate material were prepared according to the method of Example 13 by using the thermal black powder which had been heat treated by changing the heat treating conditions as shown in Table 4, and these specimens were further treated according to the process of Example 7 to obtain reaction products.

TABLE 4

|  | Heat treatment conditions | | Carbon powder properties | | Water content of particulate material before drying (% by weight) | Void fraction of particulate material (%) | Product properties | | |
| --- | --- | --- | --- | --- | --- | --- | --- | --- | --- |
|  | Temperature (°C.) | Time (hr) | Specific surface area (m²/g) | Oxygen content (% by weight) |  |  | β-SiC content (%) | SiO₂ content (% by weight) | Crushing strength (kg) |
| Example 13 | 250 | 2 | 28 | 0.37 | 12 | 45 | 96.5 | 1.5 | 1.4 |
| Example 14-1 | 200 | 2 | 26 | 0.25 | " | 46 | 96.2 | 1.3 | 1.2 |
| Example 14-2 | " | 4 | 29 | 0.40 | " | 44 | 96.8 | 1.7 | 1.5 |
| Example 14-3 | 250 | 1 | 27 | 0.25 | " | 45 | 96.6 | 1.6 | 1.4 |
| Example 14-4 | 400 | 0.5 | 25 | 1.2 | " | 40 | 97.0 | 2.0 | 2.1 |
| Comparative Example 5 | — | — | 25 | 0.15 | " | 45 | 95.7 | 1.2 | — |
| Comparative Example 6-1 | 150 | 3 | 25 | 0.17 | " | 41 | 96.8 | 1.5 | — |
| Comparative Example 6-2 | 250 | 0.3 | 26 | 0.18 | " | 45 | 96.0 | 1.3 | — |
| Comparative Example 6-3 | 700 | 0.1 | — | — | — | — | — | — | — |

Any of the thermal black powder specimens of Example 14 had good wettability by water and the reaction products had enough crushing strength to retain the initial shape. In contrast with this, the non-heat-treated thermal black powder of Comparative Example 5 could scarcely be wetted by water and the reaction product disintegrated during the SiC forming reaction. Comparative Examples 6-1 and 6-2 were not significantly improved in wettability by water due to the insufficient heat treatment and the reaction products disintegrated as in the case of Comparative Example 5. Comparative Example 6-3 caught on fire during the heat treatment.

As described above, it is possible according to this invention to produce, in a high yield and with ease, an ultrafine silicon carbide powder having an average particle size far less than 1 μm and an extremely large specific surface area, which is best suited for producing the pressureless silicon carbide sinters.

What is claimed is:

1. In a process for producing an ultrafine silicon carbide powder which comprises charging a particulate material prepared by blending and granulating silica powder, carbon powder and a carbonaceous binder into a reactor from the top thereof, said reactor having a preheating zone, a heating zone and a cooling zone, allowing the charged material to descend under its own weight in the preheating zone of said reactor till reaching the heating zone, heating said material horizontally in the heating zone to effect a SiC forming reaction, allowing the reaction product to further descend in the cooling zone for cooling it under a non-oxidizing atmosphere, and discharging the reaction product from the bottom of the cooling zone of said reactor, a process capable of preventing the disintegration of the particulate material in the course of the reaction, wherein the carbon powder contained in said particulate material is one having a specific surface area within the range from 1 to 1,000 m²/g and mixed with a liquid composed principally of a liquid organic compound before or at latest when said carbon powder is granulated, and the reaction temperature in the heating zone is controlled within the range from 1,500° to 2,000° C.

2. A process according to claim 1, wherein said carbon powder is principally composed of at least one selected from contact black, furnace black, thermal black and lamp black.

3. A process according to claim 1, wherein said liquid organic compound is composed of at least one selected from benzene, acetone, toluene, hexane, isohexane, heptane, isoheptane, isooctane, cyclohexane, ethylbenzene, chloroform, carbon tetrachloride, dichloroethane, dichloroethylene, trichloroethylene, nonane, xylene, methyl alcohol, ethyl alcohol, butyl alcohol, isobutyl alcohol, propyl alcohol, isopropyl alcohol, ethyl ether, isopropyl ether, ester of formic acid, methyl acetate, ethyl acetate, isopropyl acetate, ethyl propionate, amyl propionate, butyl lactate, diethyl carbonate, fluoroacetic acid, diethylene dimethyl ether, ethyl methyl ketone and quinoline.

4. A process according to claim 1, wherein said carbonaceous binder is composed of at least one selected from petroleum pitch, coal tar pitch, wood tar pitch, asphalt, phenolic resin, furan resin, petroleum tar, coal tar, wood tar, saccharides, ligninsulfonates and alginates.

5. A process according to claim 1, wherein the amount of said carbonaceous binder blended is within the range from 3 to 25 parts by weight, in terms of the amount of fixed carbon, to 100 parts by weight of the silica powder and carbon powder combined.

6. In a process for producing an ultrafine silicon carbide powder which comprises charging a particulate material prepared by blending and granulating silica powder, carbon powder and a carbonaceous binder into a reactor from the top thereof, said reactor having a preheating zone, a heating zone and a cooling zone, allowing the charged material to descend under its own weight in the preheating zone of said reactor until reaching the heating zone, heating the material horizontally in the heating zone to effect a SiC forming reaction, allowing the reaction product to further descend in the cooling zone for cooling it under a non-oxidizing atmosphere, and discharging the reaction product from the bottom of the cooling zone of said reaction, a process capable of preventing the disintegration of the particulate material in the course of the reaction, wherein the carbon powder contained in said particulate material is one having a specific surface area within the range from 1 to 1,000 m²/g and mixed with water containing a surfactant before said carbon powder is granulated, and the reaction temperature in the heating zone is controlled within the range from 1,500° to 2,000° C.

7. A process according to claim 6, wherein said carbon powder is principally composed of at least one selected from contact black, furnace black, thermal black and lamp black.

8. A process according to claim 6, wherein said surfactant is composed of at least one selected from amines, organic compounds having a carboxyl group, organic compounds having a sulfo group, esters, ammonium compounds, organic compounds having an ether linkage, and alcohols.

9. A process according to claim 6, wherein said surfactant is added in an amount of at least 0.05 parts by weight to 100 parts by weight of the carbon powder.

10. A process according to claim 6, wherein said carbonaceous binder is composed of at least one selected from petroleum pitch, coal tar pitch, wood tar pitch, asphalt, phenolic resin, furan resin, petroleum tar, coal tar, wood tar, saccharides, ligninsulfonates and alginates.

11. A process according to claim 6, wherein the amount of said carbonaceous binder blended is within the range from 3 to 25 parts by weight, in terms of the amount of fixed carbon, to 100 parts by weight of the silica powder and carbon powder combined.

12. In a process for producing an ultrafine silicon carbide powder which comprises charging a particulate material prepared by blending and granulating silica powder, carbon powder and a carbonaceous binder into a reactor from the top thereof, said reactor having a preheating zone, a heating zone and a cooling zone, allowing the charged material to descend under its own weight in the preheating zone of said reactor until reaching the heating zone, heating the material horizontally in the heating zone to effect a SiC forming reaction, allowing the reaction product to further descend in the cooling zone for cooling it under a non-oxidizing atmosphere, and discharging the reaction product from the bottom of the cooling zone of said reactor, a process capable of preventing the disintegration of the particulate material in the course of the reaction, wherein the carbon powder contained in said particulate material is a carbon powder having a specific surface area within the range from 1 to 1,000 $m^2/g$ and mixed with water before or at the latest when it is granulated, said carbon powder having been improved in water wettability by oxidizing the powder particle surfaces by heating in an oxidizing atmosphere, and the reaction temperature in the heating zone is controlled within the range from 1,500° to 2,000° C.

13. A process according to claim 12, wherein said carbon powder is principally composed of at least one selected from contact black, furnace black, thermal black and lamp black.

14. A process according to claim 12, wherein the heating temperature under said oxidizing atmosphere is 200° C. at the lowest 15. A process according to claim 12, wherein the oxygen content of said carbon powder is at least 0.2% by weight.

16. A process according to claim 12, wherein said carbonaceous binder is composed of at least one selected from petroleum pitch, coal tar pitch, wood tar pitch, asphalt, phenolic resin, furan resin, petroleum tar, coal tar, wood tar, saccharides, ligninsulfonates and alginates.

17. A process according to claim 12, wherein the amount of said carbonaceous binder blended is within the range from 3 to 25 parts by weight, in terms of the amount of fixed carbon, to 100 parts by weight of the silica powder and carbon powder combined.

* * * * *